United States Patent
Choiniere et al.

(10) Patent No.: US 10,162,147 B2
(45) Date of Patent: Dec. 25, 2018

(54) RED DOT WINDAGE AND ELEVATION ADJUSTMENT

(71) Applicant: BAE SYSTEMS Information and Electronic Systems Integration Inc., Nashua, NH (US)

(72) Inventors: Michael J. Choiniere, Merrimack, NH (US); James A. Sterritt, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/590,115

(22) Filed: May 9, 2017

(65) Prior Publication Data

US 2018/0329169 A1 Nov. 15, 2018

(51) Int. Cl.
| | | |
|---|---|---|
| G02B 7/02 | (2006.01) | |
| F41G 1/387 | (2006.01) | |
| F41G 1/00 | (2006.01) | |
| F41G 11/00 | (2006.01) | |
| G02B 7/00 | (2006.01) | |
| F41G 1/30 | (2006.01) | |

(52) U.S. Cl.
CPC .............. G02B 7/027 (2013.01); F41G 1/00 (2013.01); F41G 1/30 (2013.01); F41G 1/387 (2013.01); F41G 11/002 (2013.01); G02B 7/008 (2013.01)

(58) Field of Classification Search
CPC ..... F41G 1/30; F41G 1/32; F41G 1/34; F41G 1/345; F41G 1/35; F41G 3/2655; G02B 23/10; G02B 23/105
USPC ........... 42/113, 114, 115, 123, 131, 132, 146
See application file for complete search history.

(56) References Cited

U.S. PATENT DOCUMENTS

| | | | | |
|---|---|---|---|---|
| 3,678,590 | A * | 7/1972 | Hayward | F41G 1/345 356/247 |
| 3,813,790 | A * | 6/1974 | Kaltmann | F41G 1/30 356/252 |
| 4,764,011 | A * | 8/1988 | Goldstein | F41G 1/30 356/251 |
| 5,531,040 | A * | 7/1996 | Moore | F41G 1/35 362/114 |
| 5,560,113 | A * | 10/1996 | Simo | F41G 1/467 124/87 |
| 9,389,045 | B2 * | 7/2016 | Reichert | F41G 1/30 |
| 9,429,392 | B1 * | 8/2016 | Ledbetter | F41G 1/467 |
| 9,523,556 | B2 * | 12/2016 | Grace, Jr. | F41G 1/345 |
| 2016/0069640 | A1 | 3/2016 | Pretorius | |

FOREIGN PATENT DOCUMENTS

WO     2017/188923 A1     11/2017

* cited by examiner

*Primary Examiner* — Stephen Johnson
*Assistant Examiner* — Benjamin S Gomberg
(74) *Attorney, Agent, or Firm* — Davis & Bujold, PLLC

(57) ABSTRACT

An alignment subsystem that incorporates a ball and lever approach to adjust windage and elevation. The system provides a low cost, vibration immune red dot and/or reticle device for a weapon system. The materials used to construct the system also provide for temperature indifference and increased wear characteristics.

15 Claims, 3 Drawing Sheets

RED DOT WINDAGE AND ELEVATION ADJUSTMENT

FIELD OF THE DISCLOSURE

The present disclosure relates to red dot sights and reticles and more particularly to precisely adjusting the alignment of red dot sights and reticles.

BACKGROUND OF THE DISCLOSURE

Current alignment mechanisms used by the industry are translation devices such as x, y translation mechanisms with slides, stages, set screws, and the like. Some issues with these current red dot and reticle alignment mechanisms is that if used on a weapon, every time the weapon is shot, the aim point will float and result in missed targets. Additionally, if the reticle or red dot sight is used on equipment or an instrument exposed to extreme temperature variations, the aim point may also float and result in a loss of accuracy due, in part, to unequal rates of thermal expansion for the various components in the system. The nature of these set screw designs also causes wear points at the points of contact for adjustment particularly when installed on weapons since a weapon fire (500 to 700 Gs) can cause any points of contact to wear out over time.

SUMMARY OF THE DISCLOSURE

In contrast to conventional systems, the present disclosure solves the problems with prior adjustment mechanisms and provides for accurate adjustment that is temperature independent and not prone to wear. The method and system for the alignment of red dot sights and reticles of the present disclosure can project any type of reticle pattern and can be used to inject into a head mounted display weapon sight, akin to a standard red dot projection approach, or the like.

One aspect of the present disclosure is a sight alignment system comprising: a ball shaped portion having a first point on the surface of the ball portion and a second point on the surface of the ball portion that is antipodal to the first point; a ball containment structure configured to hold the ball portion in a position; a lever portion having a first end and a second end, the first end joined with the second point on the ball portion, the lever portion extending away from the second point on the ball portion; a cavity extending through the ball portion and the lever portion and extending from the second end of the lever portion to the first point on the ball portion; an optical fiber having a first end and a second end, the second end being optically coupled with a light source and the first end extending at least partially into the cavity and being configured to project an image on a target; and one or more adjustment devices configured to adjust the windage and the elevation of the lever portion, such that when the lever portion is translated in at least one of the windage and the elevation direction, the projected image is translated in a corresponding windage and elevation direction.

One embodiment of the further comprises a plurality of notches located proximal to the second end of the lever portion for accepting the adjustment devices and for prevent rotation or slipping when adjusting the at least one of the windage and the elevation of the projected image.

One embodiment of the sight alignment system is wherein the ball shaped portion and the lever portion are formed from a unitary piece of material. In some cases the ball containment structure is comprised of material having similar thermal expansion properties as the ball portion and the lever portion. In certain embodiments, at least one of the ball portion, the lever portion, and the ball containment structure are comprised of materials selected from the group consisting of aluminum, magnesium, glass, and carbon filled polymers.

In another embodiment of the sight alignment system, the ball containment structure comprises a plurality of cup like structures for holding the ball shaped portion in a position and where the plurality of cup like structures are biased to provide the ball shaped portion with resistance when being moved in at least one of the windage and the elevation direction via the lever portion.

In some cases, the image is a red dot. In some cases, the image is a reticle. In other cases, the image is both a red dot and a reticle. Yet another embodiment of the sight alignment system is wherein the system projects a red dot and a reticle and the red dot is adjusted at a weapon's range and a digital display is used to co-align the reticle with the red dot. In some cases, the system projects a reticle and a red dot and the reticle is adjusted at a weapon's range and a digital display is used to co-align the red dot with the reticle.

Another aspect of the present disclosure is a firearm sight, comprising: a day camera; a sight alignment system comprising a ball shaped portion having a first point on the surface of the ball portion and a second point on the surface of the ball portion that is antipodal to the first point; a ball containment structure configured to hold the ball portion in a position; a lever portion having a first end and a second end, the first end joined with the second point on the ball portion, the lever portion extending away from the second point on the ball portion; a cavity extending through the ball portion and the lever portion and extending from the second end of the lever portion to the first point on the ball portion; an optical fiber having a first end and a second end, the second end being optically coupled with a light source and the first end extending at least partially into the cavity and being configured to project an image on a target; and one or more adjustment devices configured to adjust the windage and the elevation of the lever portion, such that when the lever portion is translated in at least one of the windage and the elevation direction, the projected image is translated in a corresponding windage and elevation direction; a beam combiner; and a display.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

It is understood that existing red dot and reticle alignment systems are temperature and impact sensitive and are prone to wear during normal use. The present disclosure provides for an alignment subsystem that incorporates a ball and lever approach to adjust windage and elevation of a sight using simple inexpensive components. Thus, the present system provides a low cost, vibration immune sight alignment device for a weapon system. The materials used to construct the system also provide for temperature indifference as will be described in more detail below.

Figure 1:
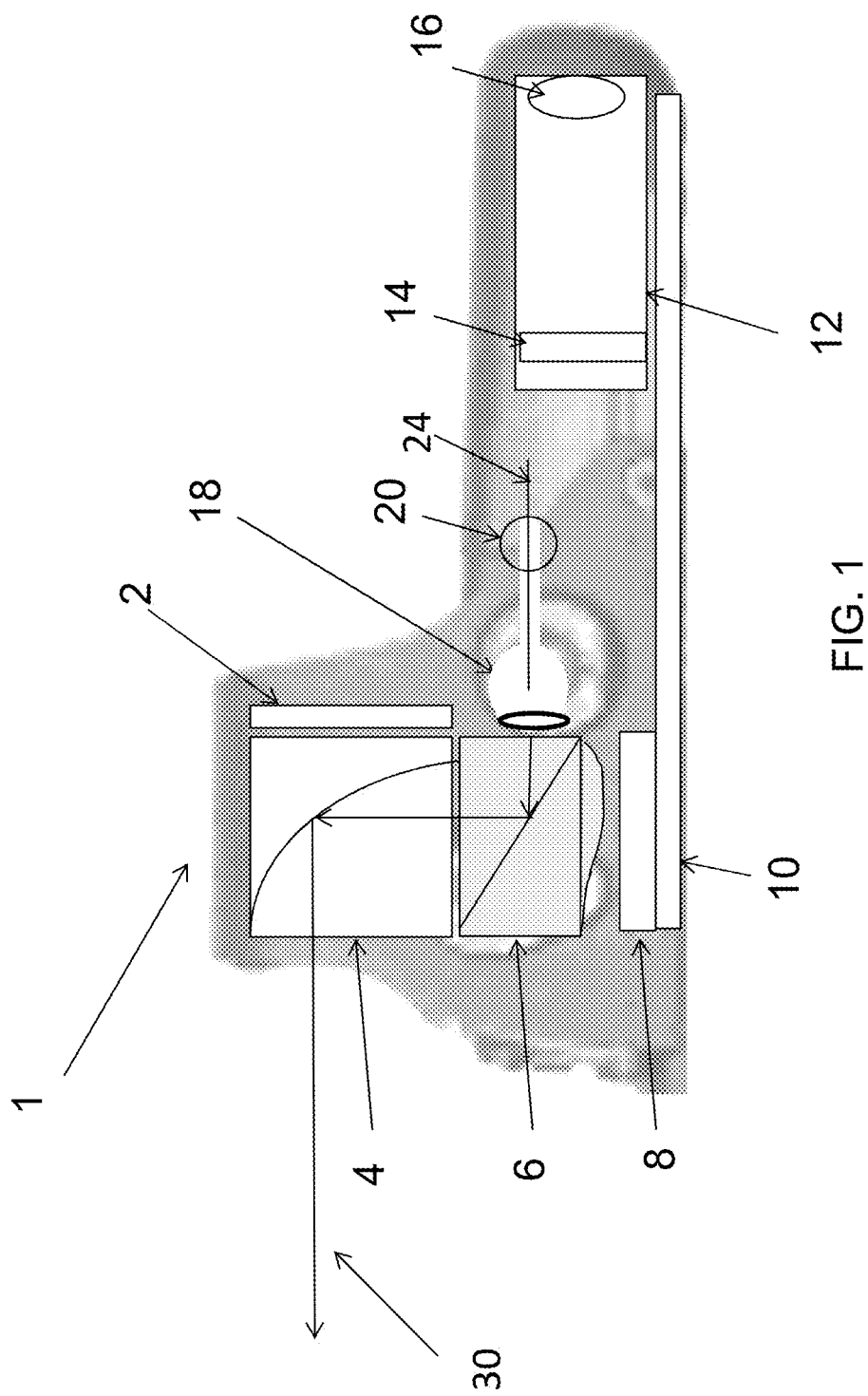
FIG. 1 shows a side view of an embodiment of a sight adjustment system of a weapon sight of the present disclosure.

Referring to FIG. 1, a side view of an embodiment of a sight adjustment system of the present disclosure is shown. More specifically, an embodiment of the system is shown as part of a weapon sight. It is understood that the system is useful in adjusting reticles, red dots, and the like in a number of devices including, but not limited to, head mounted displays, handheld or mobile weapons, and stationary instruments and weapons.

Still referring to FIG. 1, the weapon sight 1 may contain a variable transmissive LCD or opaque rotating shutter 2 to switch between weapon sight direct optics and a camera mode. The weapon sight may also contain a beam combiner 4 between the camera display 8 and the direct view optics, a beam combiner 6 to couple the red dot or desired reticle, and a processing circuit card assembly (CCA) 10. The weapon sight may also contain a day camera 12 comprising a sensor 14 and a lens 16. Together, these components provide the shooter the ability use the weapon sight as a common direct view with the red dot/reticle when the shutter is rotated up or when the LCD is transmissive. When closed or opaque, the direct path is closed and the camera 12 collects imagery and displays the information on the display 8. The display information coupled with the red dot/reticle by the beam combiner 6 provides the shooter with a virtual image that is aligned with the weapon. The image can be eZoomed to provide 2×, 4× or 8× magnification, or the like. The boresight of the weapon is retained by adjusting the virtual reticle to the actual reticle while providing the processor with the needed information to retain the weapon boresight at higher magnifications.

As shown in FIG. 1, one embodiment of the sight adjustment system comprises a ball shaped portion 18 and a lever portion 20. The lever portion 20 is used to drive Elevation adjustment (up and down in this Figure) as well as Windage (Yaw) adjustment (in and out of the page in this Figure). The sight adjustment system further comprises an optical fiber 24 coupled to a light source. The light emitting from the end of the fiber in the ball shaped portion passes through a collimating lens as a projection 30 to create a projected image, e.g., a red dot.

Figure 2:
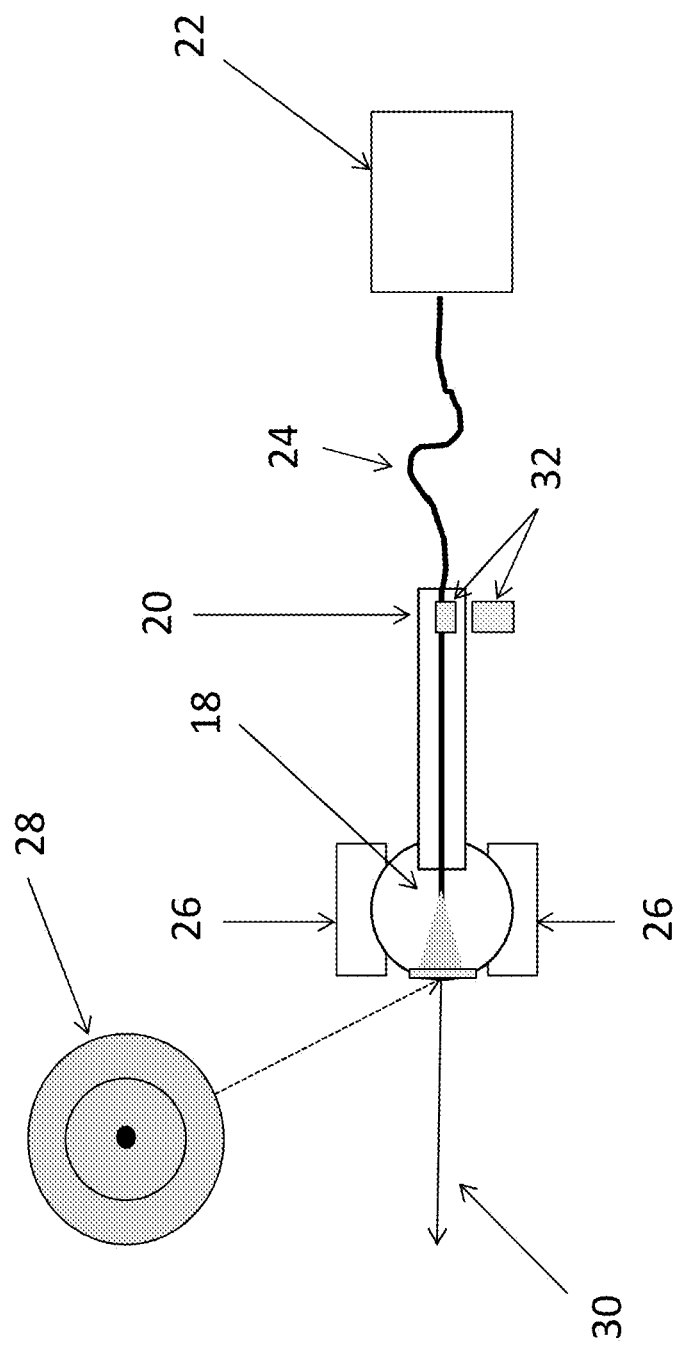
FIG. 2 shows a schematic of an embodiment of a sight adjustment system of the present disclosure.

Referring to FIG. 2, a schematic of an embodiment of a sight adjustment system of the present disclosure is shown. More specifically, a ball shaped portion 18 is connected to a lever portion 20. The ball shaped portion 18 is connected to one end of the lever portion 20. On the other end of the lever portion is an optically coupled light source 22. The lever portion 20 is used to adjust the position of a projection 30 on a viewer in the form of a projected image 28. In some cases, the projected image is a red dot. In other cases the projected image is a reticle or the like. In yet other cases, the projected image is both a red dot and a reticle, or the like, as shown in FIG. 2. The projected image is located at the image plane of the optical viewer. A small amount of lateral movement of the lever, both vertical and horizontal, will appear as windage angular adjustment (elevation and azimuth) in the plane of the view. Adjustment devices 32 are used to adjust the lever portion in the Yaw and Elevation directions. In some cases, the adjustment devices are screws. In certain embodiments, there are notches, or the like, located proximal to the second end of the lever portion that are configured to receive the adjustment device to prevent slippage or rotation of the adjustment devices during adjustment to the windage or the elevation of the lever portion.

In one embodiment, a reticle is projected from the ball portion 118, the projection portion 30 being located at a first position on the ball portion 18 opposite the point at which the lever portion 20 extends away from the ball portion. The back illuminated reticle provides a projected image that is projected into the viewer. In another embodiment, a red dot may be projected via the point on the ball portion without the use of a reticle pattern. See, FIG. 3.

In some cases, a red dot can be adjusted at the weapon's range and the digital display can turn on to co-align a digital reticle with the red dot or vice versa where the digital reticle is adjusted at the range and the red dot is adjusted to the digital reticle. This process can also account for range differentials, for example if you have a short range, you could adjust the red dot first. If the longer range is not available, you could turn on the digital reticle and adjust to the red dot, but also account for the ballistic drop due to range digital by setting the scope range.

Still referring to FIG. 2, the lever portion 20 extends out from the ball portion 18 at a point antipodal to the first point on the ball portion and the lever portion surrounds an optical fiber 24. The optical fiber 24 extends into the ball portion, at least partially, through a cavity and is enclosed within the lever portion along its length, and is optically connected to an light source 22 (e.g., a red LED). The output from the optical fiber 24 translates vertically and horizontally as the lever portion applies a greater than eight times the mechanical advantage both in displacement control and load when adjusted using one or more screws, or the like.

Figure 3:
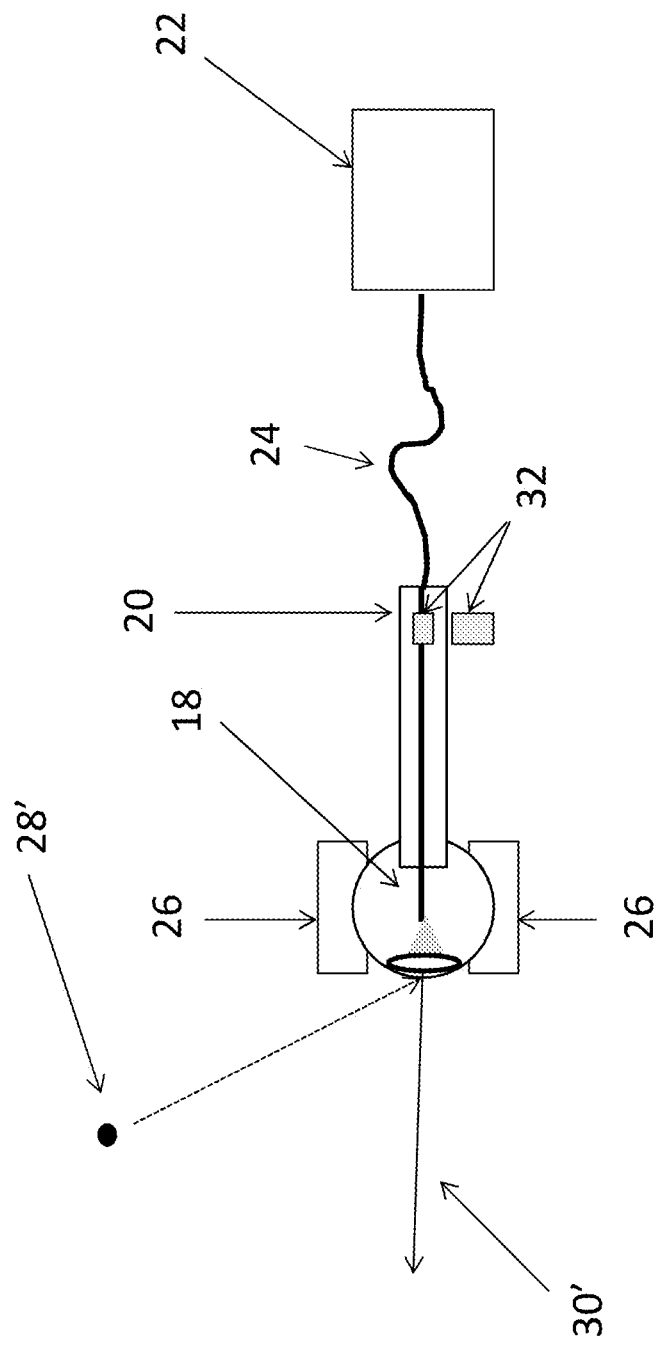
FIG. 3 shows a schematic of another embodiment of a sight adjustment system of the present disclosure.

Referring to FIG. 3, a schematic of another embodiment of a sight adjustment system of the present disclosure is shown. More specifically, a ball shaped portion 18 is connected to a lever portion 20. The ball shaped portion 18 is connected to one end of the lever portion 20. On the other end of the lever portion is an optically coupled light source 22. The lever portion 20 is used to adjust the position of the projected image 28. The red dot 28' is located at the image plane of the optical viewer. A small amount of lateral movement of the lever, both vertical and horizontal, will appear as windage angular adjustment (elevation and azimuth) in the viewer. Adjustment devices 32 are used to adjust the lever portion in the Yaw and Elevation directions. In some cases, the adjustment devices are screws.

In one embodiment, a red dot 28' is projected from the ball portion 18, the projection 30 being located at a first position on the ball portion 18 opposite the point at which the lever portion 20 extends away from the ball portion. The red dot 28' is projected via the point on the ball portion without the use of a reticle pattern, but with the use of a collimating lens.

Still referring to FIG. 3, the lever portion 20 extends out from the ball portion 18 at a point antipodal to the first point on the ball portion and the lever portion surrounds an optical fiber 24. The optical fiber 24 extends into the ball portion and is enclosed within the lever portion along its length, and is optically connected to a light source 22 (e.g., a red LED).

The output from the optical fiber 24 translates vertically and horizontally as the lever portion applies a greater than eight times the mechanical advantage both in displacement control and load when adjusted using one or more screws (not shown).

The system provides for reticle or red dot projection and positioning. The present system provides the ability to adjust a sight pattern in 0.5 MOA (minute of angle) steps over a range of +/−20 MOA (30) MOA. It is understood that MOA is 1/60 degree and is independent of range. For example, at 100 meters, 1/60 of degree is about 0.29 mrad or is off in lateral distance about 0.029 m. At 1000 meters, it is off in lateral distance about 0.290 m.

In certain embodiments, an adjustment device, such as a lever screw is rotated to push the lever to rotate the ball portion. There are no slides or stages as in prior alignment systems. In one embodiment, the lever screw travel in the present system is about 0.09 inches total or about 4.5 full turns of a 50 thread screw. In other embodiments there is no need for a differential screw. In contrast, conventional systems require a differential screw to reduce the screw travel providing a finer adjustment. The present system eliminates that need by using the lever arm, thereby reducing the part count, but more importantly, reducing the number of contact points that may wear over time.

The system further comprises a ball containment structure 26 that provides a shock resistant structure. In some cases, the ball containment structure 26 is spring-like and is biased in a direction such as to hold the ball portion 18 in a position and provide sufficient resistance to its movement so that the ball will remain in position once it has been adjusted. In certain embodiments, the ball containment structure comprises a plurality of cup-like structures for holding the ball portion. The materials of the ball containment structure 26 and the ball 18 and/or lever 20 portions of the sight adjustment system are chosen to have the same or similar thermal expansion properties to provide for temperature insensitive performance.

In some cases, the ball portion 18 and the lever portion 20 are formed of separate pieces that are later assembled. In other cases, the ball portion 18 and the lever portion 20 are formed of one unitary piece of material. Some materials that may be used would match the housing materials to ensure coefficient of expansion (CTE) compatibility to retain aim point of the weapon. Materials include, but are not limited to, aluminum, magnesium, glass or carbon filled polymers.

A table of properties for one embodiment of the red dot/reticle alignment system is shown below.

| Display FOV | 15 degrees | +/− Range | 11.6 thousands of inch |
|---|---|---|---|
| Display size | 1280 pixels | Ball diameter | 0.25 inch |
| Display IFOV | 0.204 mrads | Ball radius | 0.125 inches |
| 1 MOA | 0.290 mrads | Lever length | 1 inches |
| 0.5 MOA | 0.145 mrads | Lever advantage | 8.0 |
| Pixel size | 9.6 μm | | |
| Total range | 11.6 mrads | Max rotation | 0.09 rads |
| Total Display FOV | 56.9 pixels | Max rotation | 92.84 mrads |
| Total range dim | 546.13 μm | Max rotation | 5.34 degrees |
| Total range dim | 0.5461 mm | Max +/− angle | 2.67 degrees |
| Total range dim | 23.21 thousands of inch | Screw range +/− | 92.8 thousands of inch |

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A sight alignment system comprising:
   a variable transmissive LCD or opaque rotating shutter;
   a beam combiner;
   a camera;
   a digital display;
   a circuit card assembly;
   a ball shaped portion having a first point on a surface of the ball shaped portion and a second point on the surface of the ball shaped portion that is antipodal to the first point, wherein the first point and the second point form a line;
   a ball containment structure configured to hold the ball shaped portion in a position despite exposure to vibration or changes in temperature;
   a lever portion having a first end, a longitudinal axis, and a second end, the first end joined with the second point on the ball shaped portion, the lever portion extending away from the second point on the ball shaped portion such that the longitudinal axis and the line are aligned;

a cavity extending through the ball shaped portion and the lever portion and extending from the second end of the lever portion to the first point on the ball shaped portion;

an optical fiber having a first end and a second end, the second end being optically coupled with a light source and the first end extending at least partially into the cavity and being configured to project an image on a viewer; and one or more adjustment devices configured to adjust a windage and an elevation direction of the lever portion, such that when the lever portion is translated in at least one of the windage and the elevation direction, the first end of the optical fiber is displaced in a corresponding horizontal and vertical direction within the cavity to produce corresponding movement of the image in 0.5 MOA (minute of angle) steps over a range of +/−20 MOA.

2. The sight alignment system of claim 1, wherein the ball shaped portion and the lever portion are formed from a unitary piece of material.

3. The sight alignment system of claim 1, wherein the ball containment structure, the ball shaped portion, and the lever portion are comprised of one or more materials each having thermal expansion properties such that temperature insensitive performance is ensured as indicated by retaining aim point.

4. The sight alignment system of claim 1, wherein the ball containment structure comprises a plurality of curved structures for holding the ball shaped portion in the position and where the plurality of curved structures are biased to provide the ball shaped portion with resistance when the lever portion is moved in the at least one of the windage and the elevation direction.

5. The sight alignment system of claim 1, wherein at least one of the ball shaped portion, the lever portion, and the ball containment structure are comprised of materials selected from the group consisting of aluminum, magnesium, glass, and carbon filled polymers.

6. The sight alignment system of claim 1, wherein the image projected by the first end of the optical fiber is a red dot.

7. The sight alignment system of claim 1, wherein the image projected by the first end of the optical fiber is a reticle.

8. The sight alignment system of claim 1, further comprising a plurality of notches located proximal to the second end of the lever portion for accepting the one or more adjustment devices and for preventing rotation or slipping of the one or more adjustment devices when adjusting the at least one of the windage and the elevation direction of the lever portion.

9. The sight alignment system of claim 1, wherein when the variable transmissive LCD is transmissive or the opaque rotating shutter is open, the image projected by the first end of the optical fiber is a reticle and/or a red dot and can be coupled via the beam combiner and used to co-align the reticle and/or the red dot with a digital reticle, such that the reticle and/or the red dot is adjusted to the digital reticle.

10. The sight alignment system of claim 1, wherein the variable transmissive LCD or the opaque rotating shutter is configured to switch between a camera mode and a direct view optics mode such that when in the direct view optics mode, the opaque rotating shutter is rotated up or the variable transmissive LCD is transmissive, providing the viewer with a direct view of both a target and the projected image, and when in the camera mode, the opaque rotating shutter is closed or the variable transmissive LCD is opaque, closing the direct view of the target while the camera collects an image of the target and displays the image of the target on the digital display.

11. A firearm sight, comprising:
a sight alignment system comprising:
a variable transmissive LCD or opaque rotating shutter;
a beam combiner;
a camera, comprising a sensor and a lens;
a display;
a circuit card assembly;
a ball shaped portion having a first point on a surface of the ball shaped portion and a second point on the surface of the ball shaped portion that is antipodal to the first point;
a ball containment structure configured to hold the ball shaped portion in a position despite exposure to vibration or changes in temperature;
a lever portion having a first end and a second end, the first end joined with the second point on the ball shaped portion, the lever portion extending away from a surface normal located at the second point on the ball shaped portion;
a cavity extending through the ball shaped portion and the lever portion and extending from the second end of the lever portion to the first point on the ball shaped portion;
an optical fiber having a first end and a second end, the second end being optically coupled with a light source and the first end extending partially into the cavity and being configured to project an image on a viewer; and
one or more adjustment devices configured to adjust a windage and an elevation direction of the lever portion, such that when the lever portion is translated in at least one of the windage and the elevation direction, the first end of the optical fiber is displaced in a corresponding horizontal and vertical direction within the cavity to produce corresponding movement of the image in 0.5 MOA (minute of angle) steps over a range of +1-20 MOA.

12. The firearm sight of claim 11, wherein the sight alignment system further comprises a plurality of notches located proximal to the second end of the lever portion for accepting the one or more adjustment devices and for preventing rotation or slipping of the one or more adjustment devices when adjusting the at least one of the windage and the elevation direction of the lever portion.

13. The firearm sight of claim 11, wherein the ball containment structure comprises a plurality of curved structures for holding the ball shaped portion in the position and where the plurality of curved structures are biased to provide the ball shaped portion with resistance when the lever portion is moved in the at least one of the windage and the elevation direction.

14. The firearm sight of claim 11, wherein at least one of the ball shaped portion, the lever portion, and the ball containment structure are comprised of materials selected from the group consisting of aluminum, magnesium, glass, and carbon filled polymers.

15. The firearm sight of claim 11, wherein the variable transmissive LCD or the opaque rotating shutter is configured to switch between a camera mode and a direct view optics mode such that when in the direct view optics mode, the opaque rotating shutter is rotated up or the variable transmissive LCD is transmissive, providing the viewer with a direct view of both a target and the projected image, and when in the camera mode, the opaque rotating shutter is closed or the variable transmissive LCD is opaque, closing the direct view of the target while the camera collects an image of the target and displays the image of the target on the display.

\* \* \* \* \*